United States Patent

Helderman

[11] 3,921,496
[45] Nov. 25, 1975

[54] FASTENER ASSEMBLY

[76] Inventor: J. Frank Helderman, 414 S. Maple St., Graham, N.C. 27253

[22] Filed: Nov. 4, 1974

[21] Appl. No.: 520,448

[52] U.S. Cl. .............................. 85/83; 85/20; 85/85
[51] Int. Cl.² ........................................ F16B 13/06
[58] Field of Search .............. 85/83, 84, 85, 44, 20, 85/23

[56] References Cited
UNITED STATES PATENTS

| | | | |
|---|---|---|---|
| 1,168,770 | 1/1916 | Wagner | 85/83 |
| 1,434,806 | 11/1922 | Brown | 85/85 |
| 1,922,120 | 8/1933 | Brosig | 85/85 |
| 3,022,701 | 2/1962 | Potruch | 85/83 |
| 3,199,398 | 10/1965 | Weisz | 85/83 |
| 3,461,772 | 8/1969 | Barry | 85/83 |
| 3,668,968 | 6/1972 | Modrey | 85/83 |
| 3,832,931 | 9/1974 | Talan | 85/83 |

FOREIGN PATENTS OR APPLICATIONS

| | | | |
|---|---|---|---|
| 1,488,075 | 5/1967 | France | 85/83 |

*Primary Examiner*—Marion Parsons, Jr.
*Attorney, Agent, or Firm*—Richards, Shefte & Pinckney

[57] ABSTRACT

A fastener assembly including a resilient sheath member having a longitudinal center opening in which is positioned a pin member. The external surfaces of both the sheath member and the pin member are formed with threads having the same depth and pitch, and the pin member threads are disposed in staggered relation to the sheath member threads when the pin member is positioned in the sheath. The threads may be a plurality of longitudinally spaced buttressed annular rings, or may be a continuous helical thread. In the latter embodiment, the pin member head portion is formed to engage an end face of the sheath member and to receive a screw driver tool for extracting the fastener assembly.

12 Claims, 8 Drawing Figures

FASTENER ASSEMBLY

BACKGROUND OF THE INVENTION

A wide variety of fastener elements are presently being used to secure liners, wall panels and the like in place, and most of such fastener elements provide satisfactory results in generally static operating conditions, as, for example, where the liners or wall panels are attached to a permanent, stationary base. However, in applications where such liners or wall panels are used as protective linings on the interior walls of trucks or other vehicles, the movement of the vehicle causes a rather significant amount of vibration which may cause loosening of the fasteners and reduce their effectiveness in holding the inner lining in place.

For example, conventional wood or sheet metal screws will quickly loosen when subjected to ordinary vehicle vibration, and this loosening, in addition to permitting the attached lining to become loose, can result in the projecting fastener snagging the cargo which is transported in the vehicle. Also, aluminum drive rivets and POP rivets are sometimes used, and while they have a greater capacity to resist vibration than screws, they may ultimately vibrate loose and they have the additional disadvantage of readily transferring heat in refrigerated vehicles because they provide metal-to-metal contact. Finally, plastic drive rivets have been used in vehicles because of their relatively high resistance to loosening under vibration and because they are not good conductors of heat, but their rivets have the disadvantage of breaking, particularly during installation in cold, dry weather, and they have the additional disadvantage of having thick heads which will protrude undesirably into the cargo space unless the rivet hole is counter-sunk at a relatively high labor cost.

It has also been proposed heretofore to provide fastener units consisting generally of a resilient anchoring member which is placed in a wall opening to receive a metal screw or nail, the resilient anchoring member having an exterior surface which engages the opening when the nail or screw is placed in the anchoring member to thereby provide a purchase on the interior surfaces of the opening. Typical examples of said fastener units are disclosed in U.S. Pat. No. 3,022,701, issued Feb. 27, 1962 to Potruch, U.S. Pat. No. 3,213,745, issued Oct. 26, 1965 to Dwyer, and U.S. Pat. No. 3,213,746, issued Oct. 26, 1965 to Dwyer. The anchoring members and the screws or nails used therewith may be provided with exterior threaded portions, and the screw or nail is forced into the anchoring member after the anchoring member has been inserted in the wall opening. Moreover, the threads on the anchoring member have no particular relation to the threads on the screw, and, consequently the forcing of the screw into the anchoring member results in an uneven spreading of the anchoring member whereby most of the purchase of the anchoring member is concentrated in relatively small areas where the screw threads press the anchoring member threads outwardly because of their coincident location. Also, since the relationship between the screw threads and the anchoring member threads is random, there is no uniform holding force applied to the screw threads by the anchoring member.

By substantial contrast, the present invention provides a fastener assembly which overcomes the aforementioned drawbacks of known fasteners and which offers substantial resistance to loosening even in applications where significant vibration is encountered.

SUMMARY OF THE INVENTION

The fastener assembly of the present invention includes a sheath member formed of a resilient material, and this sheath member has an interior opening extending longitudinally therethrough and an exterior surface provided with projecting thread portions. Additionally, the fastener assembly includes a pin member, such as a screw, having projecting thread portions formed along the exterior surface thereof, and this pin member is positionable in the interior opening of the sheath member with the crests of thread portions of the pin member being located in general alignment with the grooves of the thread portions of the sheath member. The interior surface of the sheath member is relatively smooth and unthreaded to provide a spacing between the grooves of the pin member thread portions and the sheath member interior surface. By virtue of this positioning of the thread portions on the pin member and sheath member, respectively, the insertion of the fastener assembly in an undersized wall opening or the like will result in a cold flow of the sheath member into the spacing between the grooves of the pin member thread portions and the sheath member interior surface whereby the sheath member thread portions will be urged against the confines of the wall opening with a substantial, generally uniform force to resist loosening of the fastener assembly from its inserted position, and whereby a uniform resistance to removal of the pin member will be exerted against each thread of the pin member.

Preferably, the sheath member thread portions have a pitch and depth which are the same as the pitch and the depth of the pin member thread portions, and when the pin member is in place within the sheath member, the pin member thread portions are disposed midway between corresponding sheath member thread portions, and vice versa, whereby the aforementioned cold flow of the sheath member thread portions is uniform throughout the length of the fastener assembly.

In one disclosed embodiment of the present invention the sheath member thread portions and the pin member thread portions are in the form of buttressed annular rings, and the pin member has a head portion arranged to lie flush against a flat end face of the sheath member to thereby properly position the thread members of the sheath member and pin member as set forth above.

In an alternate embodiment of the present invention, the thread portions of the pin member and sheath member form continuous helical threads thereon whereby the fastener assembly may be readily removed, when desired, using a screwdriver or similar tool. In this embodiment of the present invention, the head of the pin member is formed with a projection that engages the end face of the sheath member so that they turn together for withdrawal or removal, and the pin member head is also formed to receive a screwdriver or similar tool.

DESCRIPTIONN OF THE PREFERRED EMBODIMENTS

Figure 1:
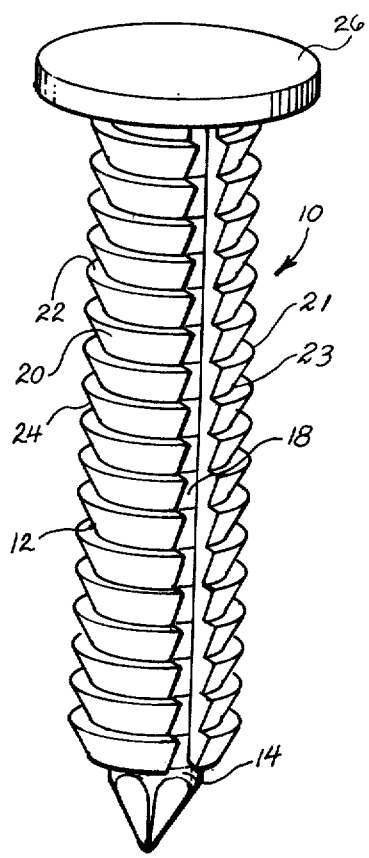
FIG. 1 is a perspective view illustrating one embodiment of the fastener assembly of the present invention.

Looking now in greater detail at the accompanying drawings, FIGS. 1–4 illustrate a first embodiment of the present invention which comprises a fastener assembly 10 including a sheath member 12 and a pin member 14.

The sheath member 12 is formed of a resilient material such as plastic or rubber and has a generally cylindrical shape with an opening extending longitudinally through the center thereof and providing a relatively smooth and unthreaded interior surface 16 on the sheath member 12; and a longitudinal opening or slot 18 extends through the wall of the sheath member 12. The exterior surface of the sheath member 12 is provided with threads 20 in the form of buttressed annular rings, each including a flat surface portion 22 that extends in perpendicular relation to the central axis of the sheath member 12 and a conical surface portion 24 extending obliquely from the flat surface portion 22. The resulting threads 20 are thus formed with crests 21 and grooves 23. The pitch of the threads 20 is indicated by the letter *x* in FIG. 2, and the depth of the threads is indicated by the letter *y*.

Figure 2:
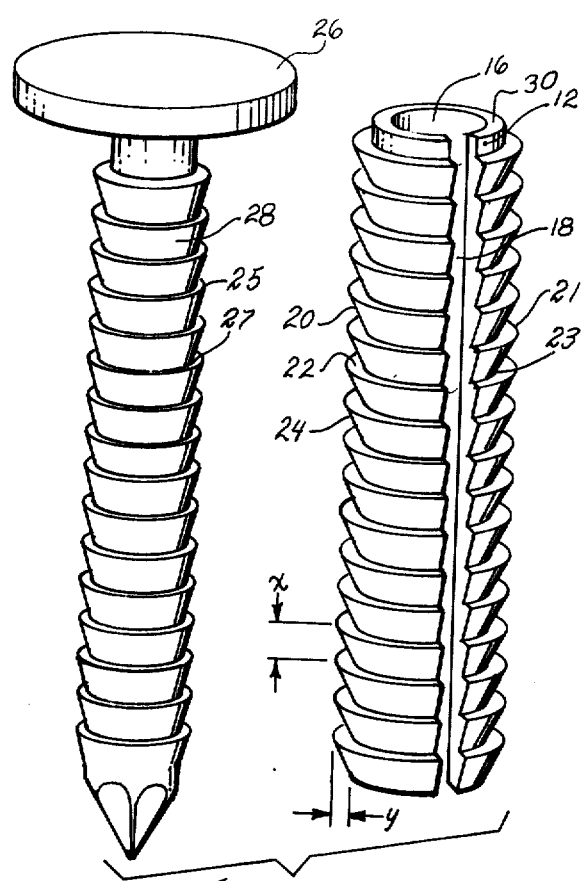
FIG. 2 is a perspective view of the fastener assembly shown in FIG. 1, illustrating the pin member and the sheath member separately.

The pin member 14, as best seen in FIG. 2, is made of a hard material such as metal and may be in the general form of a screw. The pin member 14 includes a relatively thin flat head 26, and threads 28 projecting from the exterior surface thereof in the form of buttressed annular rings which are identical in shape, pitch, and depth to the aforementioned threads 20 of the sheath member 12 and have corresponding crests 25 and grooves 27.

Figure 3:
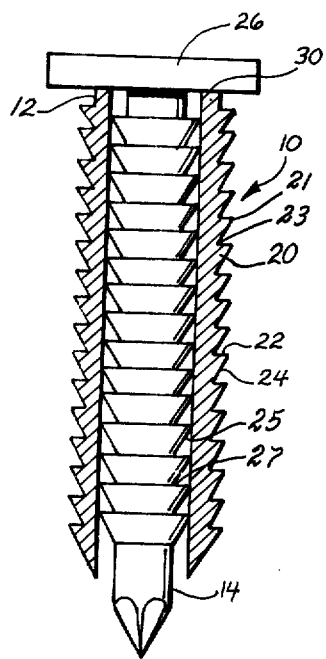
FIG. 3 is an elevation view, partly in section, of the fastener assembly shown in FIG. 1, and illustrating the position of the pin member within the sheath member.

Prior to use, the pin member 14 is inserted in the central opening of the sheath member 12 in contact with the interior surface 16 thereof to form the fastener assembly 10 illustrated in FIGS. 1 and 3. To insure a secure fit between the pin member 14 and the sheath member 12, it is preferable that the inside diameter of the central sheath member be slightly smaller than the major diameter of the pin member 14 whereby the resilient sheath member 12 will grasp the pin member 14, it being noted that the longitudinal sheath member slot 18 facilitates the assembly of the pin member 14 and the sheath member 12 by permitting temporary expansion of the central opening during such assembly. The pin member 14 is disposed within the sheath member 12 with the head 26 of the pin member 14 flush against the flat top surface 30 of the sheath member 12, and both the pin member 14 and the sheath member 12 are particularly designed so that, in this assembled position, each of the pin member threads 28 will be disposed longitudinally midway between two adjacent threads 20 of the sheath member 12 as best seen in FIG. 3 wherein it is seen that the crests 21 of the sheath member 12 are in general alignment with the grooves 27 of the pin member 14 and with a spacing between 27 of the pin member 14 and with a spacing between the interior surface 16 of the sheath member 12 and the grooves 27 of the pin member 14.

Figure 4:
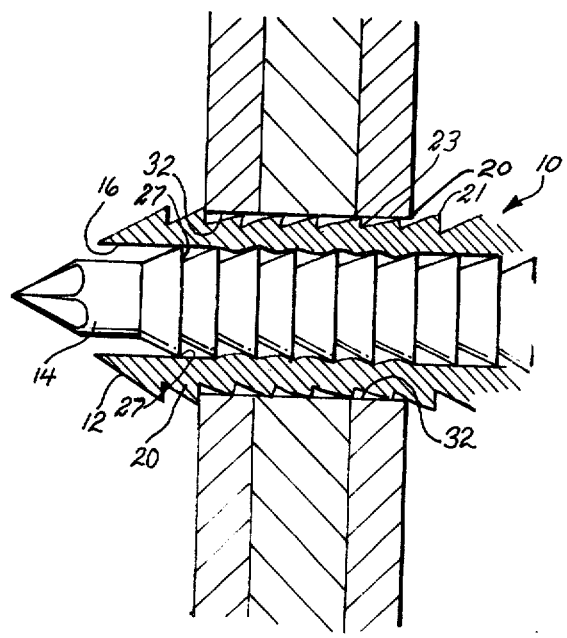
FIG. 4 is a detail view of the fastener assembly shown in FIG. 1, and illustrating the cold flow of the sheath member thread portions when the fastener assembly is inserted in an undersized wall opening.

To use the fastener assembly 10 of the present invention, it is hammered or otherwise inserted into a predrilled undersized opening 32 in a wall 34 or the like as shown in FIG. 4. For example, if the major diameter of the fastener assembly 10 is three-sixteenths inch (0.1875), the opening 32 should be formed with a No. 16 drill (0.177 inch) or a No. 17 drill (0.173 inch). However, as will become apparent, the opening 32 need not be accurately sized. The fastener assembly 10 of the present invention has been found to work satisfactorily even in openings which are carelessly drilled with a hand-held drill.

When the fastener assembly 10 is inserted in an undersized opening 32 as aforesaid, the threads 20 of the sheath member 12 will be compressed, and, as best seen in FIG. 4, there will be a cold flow of the resilient sheath member material into the cavities or spaces at the grooves 27 of the pin member 14 between crests 25 of the adjacent threads 28 of the pin member 14. Because of the uniform staggering of the pin member threads 28 with respect to the sheath member threads 20 as previously described, this cold flow of material will also be generally uniform whereby each cavity or spacing between the pin member threads 28 will be uniformly filled, at least in part, with compressed sheath member material to prevent removal of the pen member 14. Moreover, since the compressed sheath member material is equally distributed between the pin member threads 28, there is no tendency of the compressed sheath member material to move the pin member 14 longitudinally with respect to the sheath member 12 as may be the case where unequal compressive forces are exerted on the individual threads 28. Finally, because of the uniform staggering of the threads 20 and 28, the force exerted outwardly against the confines of the wall opening 32 by each sheath member thread 20 is generally uniform to provide an evenly distributed, and substantial holding force for retaining the fastener assembly 10 in the wall opening 32.

In FIGS. 5–8, an alternative embodiment of the present invention is illustrated which comprises a fastener assembly 110 generally similar to the previously described fastener assembly 10, except that the thread formation is modified and provision is made for assuring that the fastener assembly 110 can be rotated or turned as a unit for retraction.

The fastener assembly 110 includes a resilient sheath member 112 formed with a central opening providing a relatively smooth and unthreaded interior surface 116 and a longitudinally extending slot 118, and a pin member 114 is insertable in the sheath member 112 as in the previously described embodiment.

Figure 5:
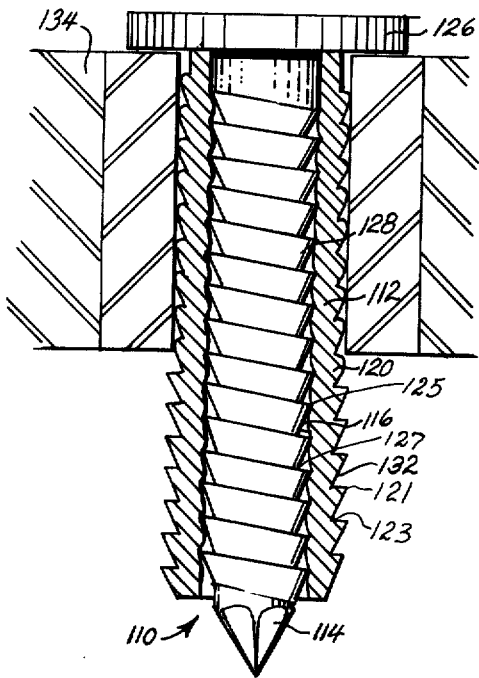
FIG. 5 is an elevation view, partly in section, illustrating an alternate embodiment of the fastener assembly of the present invention.
Figure 6:
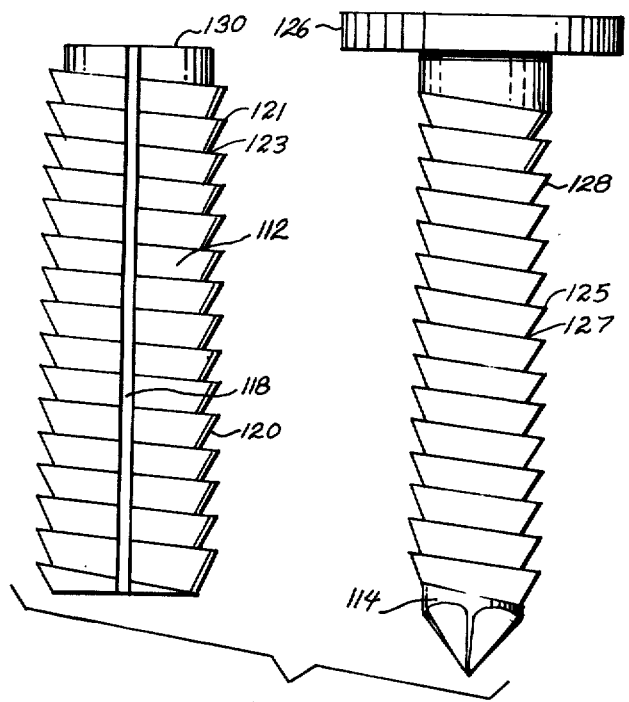
FIG. 6 is a perspective view illustrating the sheath member and the pin member of the fastener assembly shown in FIG. 5.

The thread portions on the exterior surface of the sheath member 112 are in the form of a continuous helical thread 120 having crests 121 and grooves 123, and the thread portions on the exterior surface of the pin member 114 are likewise in the form of a continuous helical thread 128 having crests 125 and grooves 127 having the same thread pitch and thread depth as the sheath member thread 120. As with the previously described embodiment, the threads 120 and 128 are particularly arranged so that when the head 126 of the pin member 114 is positioned against the upper flat face 122 of the sheath member 112, each turn of the helical pin member thread 128 will be disposed longitudinally midway between two corresponding turns of the helical sheath member thread 120, and vice versa, with the crests 121 of the sheath member 112 in general alignment with the grooves 127 of the pin member 114 and with a spacing between the interior surface 116 of the sheath member 112 and the grooves 127 of the pin member 114 as best seen in FIGS. 5 and 7.

Figure 7:
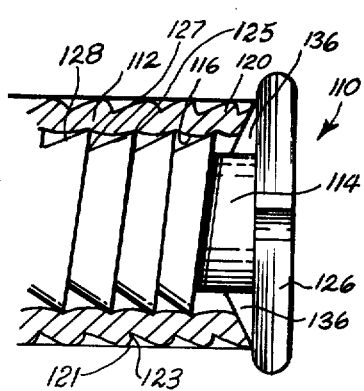
FIG. 7 is a detail view, partly in section, of the fastener assembly shown in FIG. 5.
Figure 8:
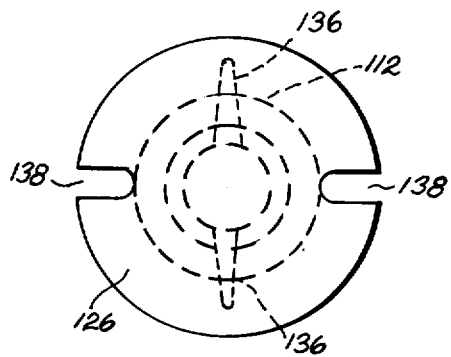
FIG. 8 is a plan view of the fastener assembly shown in FIG. 5.

Additionally, the bottom face of the pin member head 126 is provided with two fin elements 136 projecting therefrom for positively engaging the sheath member 112 at the top face 130 thereof when the pin member 114 is properly inserted in the sheath member 112 as best seen in FIG. 7. The pin member head 126 is also provided with two slots 138 extending inwardly from the circumference of the head 126 at locations spaced 180° from one another for receiving a special duplex blade screwdriver. It is to be understood, however, that the pin member head 126 could be provided with other types of receptions to receive other types of screwdriver tools, if desired.

The fastener assembly 110 is hammered or otherwise inserted in an undersized opening 132 in a wall 134 (FIG. 5) in the same manner as that previously described, to cause a similar cold flow of the resilient material of the sheath member 112 between the pin member threads 128 into the spacing between the interior surface 116 of the sheath member 112 and the grooves 127 of the pin member 114 as previously described, whereby the fastener assembly 110 will be securely held in the wall opening 132 for the same reasons set forth above in connection with the description of the embodiment shown in FIGS. 1-4.

Additionally, the fin elements 136 will positively engage the sheath member 112 as illustrated in FIG. 7, whereby the entire fastener assembly 110 can be turned or rotated as a unit when a tool is used to engage the slots 138 in the pin member head 126. Because of the helical thread 120 on the sheath member 112, turning or rotating of the fastener assembly 110 in a proper direction will permit the fastener assembly 110 to be readily extracted from the wall opening 132. Thus, the fastener assembly 110 illustrated in FIGS. 5-8 has all of the significant holding characteristics of the fastener assembly 10 illustrated in FIGS. 1-4, and it can also be readily removed if desired.

The present invention has been described in detail above for purposes of illustration only and is not intended to be limited by this description or otherwise to exclude any variation or equivalent arrangement that would be apparent from, or reasonably suggested by, the foregoing disclosure to the skill of the art.

I claim:

1. A fastener assembly for use in securing wall panels and the like in place, said fastener assembly including a sheath member formed of resilient material and having an interior opening extending longitudinally therethrough with a relatively smooth and unthreaded interior surface and having projecting thread portions formed along the exterior surface thereof defined by crests and grooves, and a pin member having projecting thread portions formed along the exterior surface thereof defined by crests and grooves, said pin member being positioned in said opening of said sheath member with the crests of the thread portions of said sheath member being located in general alignment with the grooves of the thread portions of the pin member and with a spacing between the interior surface of said sheath member and the grooves of the pin member whereby the thread portions of said sheath member will flow into said spacing when said fastener assembly is inserted in an undersized opening.

2. A fastener assembly as defined in claim 1 and further characterized in that the pitch of said sheath member thread portions is the same as the pitch of said pin member thread portions.

3. A fastener assembly as defined in claim 1 and further characterized in that the depth of said sheath member thread portions is the same as the depth of said pin member thread portions.

4. A fastener assembly as defined in claim 1 and further characterized in that said sheath member includes a longitudinally extending slot formed therein.

5. A fastener assembly as defined in claim 1 and further characterized in that said interior opening of said sheath member is formed with a diameter which is slightly less than the major diameter of said pin member.

6. A fastener assembly as defined in claim 1 and further characterized in that said sheath member thread portions and said pin member thread portions are in the form of buttressed annular rings.

7. A fastener assembly as defined in claim 6 and further characterized in the depth and pitch of said sheath member buttressed annular rings are the same as the depth and pitch of said pin member buttressed annular rings.

8. A fastener assembly as defined in claim 7 and further characterized in that said sheath member is formed with a flat face at one longitudinal end thereof, in that said pin member is formed with a head portion having a flat bottom surface, and in that each of said buttressed annular rings of said pin member will be disposed longitudinally midway between two buttressed annular rings of said sheath member when said flat bottom surface of said pin member head portion lies flush against said flat face of said sheath member.

9. A fastener assembly as defined in claim 1 and further characterized in that said sheath member thread portions and said pin member thread portions are in the form of continuous helical threads.

10. A fastener assembly as defined in claim 9 and further characterized in that the depth and pitch of said sheath member helical thread are the same as the depth and pitch of said pin member helical thread.

11. A fastener assembly as defined in claim 10 and further characterized in that said sheath member is formed with a flat face at one longitudinal end thereof, in that said pin member is formed with a head portion having at least one fin element projecting from the bottom surface thereof, in that said fin element is arranged to engage said flat face of said sheath member when said pin member head portion is positioned against said flat face to dispose the crests of the sheath member threads in general alignment with the grooves of the pin member threads when said pin member head portion is positioned against said flat face of said sheath member.

12. A fastener assembly as defined in claim 11 and further characterized in that said pin member head portion is formed with slot means for receiving a screw driver tool.

* * * * *